United States Patent [19]

Girscher et al.

[11] Patent Number: 4,937,858
[45] Date of Patent: Jun. 26, 1990

[54] TELEPHONE HANDSET WITH ELECTRO-ACOUSTIC CONVERTERS ELECTRICALLY CONNECTED BY A CORD

[75] Inventors: Wolfgang Girscher, Frankfurt/Main; Karl-Heinz Niederhofer, Frankfurt-Hochst, both of Fed. Rep. of Germany

[73] Assignee: Telenorma Telefonbau und Normalzeit GmbH, Fed. Rep. of Germany

[21] Appl. No.: 229,569

[22] Filed: Aug. 5, 1988

[30] Foreign Application Priority Data

Aug. 17, 1987 [DE] Fed. Rep. of Germany ....... 3727328

[51] Int. Cl.[5] .......................... H04M 1/03; H04M 1/15
[52] U.S. Cl. ..................................... 379/433; 379/429; 379/438; 379/442
[58] Field of Search ................ 379/433, 429, 438, 442; 439/395, 396

[56] References Cited

U.S. PATENT DOCUMENTS

| | | | |
|---|---|---|---|
| 3,110,329 | 11/1963 | Lhomme et al. | 439/395 |
| 4,237,350 | 12/1980 | Ruzic | 379/433 |
| 4,367,004 | 1/1983 | Fujiura et al. | 439/396 |
| 4,407,557 | 10/1983 | Hayes | 439/396 |
| 4,518,830 | 5/1985 | Drexler et al. | 379/438 |
| 4,633,044 | 12/1986 | Nakajima | 379/433 |

FOREIGN PATENT DOCUMENTS

| | | |
|---|---|---|
| 1590699 | 1/1970 | Fed. Rep. of Germany . |
| 2433824 | 1/1976 | Fed. Rep. of Germany . |
| 2440841 | 3/1976 | Fed. Rep. of Germany ...... 379/433 |
| 3311447 | 10/1984 | Fed. Rep. of Germany ...... 439/395 |
| 3516290 | 11/1986 | Fed. Rep. of Germany . |
| 2165405 | 4/1986 | United Kingdom ................ 439/395 |

OTHER PUBLICATIONS

"Wire to Board Terminal" Suel Shannon, Conference: 13th Annual Connector Symposium Proceedings, Philadelphia, Pa., Oct. 8–9, 1980, pp. 225–232.
Teleconnect-Dec. 1987, pp. 188, Suttle ad.
IBM Technical Disclosure Bulletin, vol. 31, No. 7, Dec. 1988, pp. 6–8.

*Primary Examiner*—Jin F. Ng
*Assistant Examiner*—Danita R. Byrd
*Attorney, Agent, or Firm*—Steele, Gould & Fried

[57] ABSTRACT

A handset for telephones and the like has electro-acoustical capsules for hearing and speaking, mounted between an upper housing shell and a lower housing shell of the handset. Each of the capsules is connected to the handset cord by a pair of leads received in cutting clamp connections arranged on the rear sides of the hearing and speaking capsules, the opposed housing shells having projections pushing the leads into the cutting clamps. Preferably, the leads are mounted on a foil having openings for the cutting clamps and the projections, and also openings for guide pins, whereby the leads are guided into the cutting clamps when the upper and lower housing shells are brought together on the leads.

8 Claims, 3 Drawing Sheets

FIG. I

TELEPHONE HANDSET WITH ELECTRO-ACOUSTIC CONVERTERS ELECTRICALLY CONNECTED BY A CORD

BACKGROUND OF THE INVENTION

1. Field of the Invention

The invention concerns a handset consisting of one lower and one upper housing shell for accommodating the hearing and speaking capsules and their respective electrical connections, each of which is connected by means of a pair of leads to the handset cord, which is introduced without tension into the handset at the speaker capsule end.

2. Prior Art

Such a handset is already known. Thus, the German patent specification DE-AS 24 33 824 describes a handset for telephone installations, consisting of two housing halves, whereby the acoustic converter is attached to the contact cord by means of spring actuated clamps. As a rule, an electro-acoustic converter has two connections designed for connecting clamps. Accordingly, 4 electrical connections are to be established by means of clamps during the assembly of such a handset in order to electrically connect the electro-acoustic converter to the handset cord. After insertion of the electro-acoustic converter into the lower housing shell and after connecting it electrically, the upper housing shell is placed onto the lower housing shell, and the two shells are attached to one another by appropriate means. The assembly cost for a handset of this nature is considerable.

SUMMARY OF THE INVENTION

An object of the invention is to provide a handset for a telephone extension set whereby more rational assembly is possible, particularly a simpler execution of the electrical connections.

This object is achieved in that the electrical connections of the hearing and speaking capsules are designed as cutting clamp connections, whereby these are located on those sides of the hearing and speaking capsules which are turned away from the converter opening, and the upper housing shell has projections, whereby in each case, two projections on each side of a cutting clamp connection are arranged vertically to the direction of the lead.

By using cutting clamps, which are already known from patent specification DE-AS 1 590 699, it is possible to significantly decrease the cost of establishing the electrical connections. After the electro-acoustic converters have been inserted into the lower housing shell, and when the two housing shells are attached to one another, the leads are introduced into the openings of the cutting clamp connections and pressed into the said cutting clamp connections by means of the projections on the upper housing shell.

It is already known how to provide the electro-acoustic converters of a handset with vertically arranged connecting pins provided on that side which is turned away from the opening of the same. In that case, the electro-acoustic converter is surrounded by a foam material and inserted into a handle, whereby the electrical connection with the handset cord is also established via the plug connection (DE-OS 35 16 290).

A further development of the invention consists in that the lead pairs are held in position by means of a foil. This facilitates the insertion of the leads into the cutting clamp, particularly if the foil has corresponding guide openings into which the guide pins engage, which are arranged on the upper or lower housing shell.

Additional advantages are described hereinafter.

BRIEF DESCRIPTION OF THE DRAWINGS

The invention is explained in greater detail with reference to an execution example which is represented in the drawing.

The following is shown.

DETAILED DESCRIPTION OF THE PREFERRED EMBODIMENTS

Figure 1:
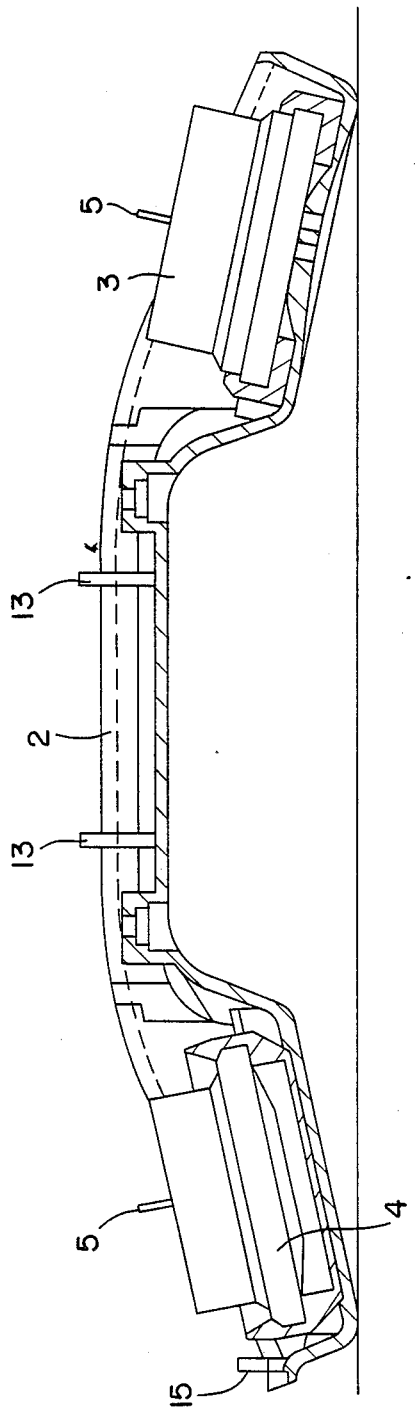
FIG. 1 a section through the lower housing shell with the inserted electro-acoustic converters, FIG. 2 a cross section through the handset in the area of an electro-acoustic converter, FIG. 3 the structure of the foil supporting the leads, FIG. 4 a section through the assembled handset.
Figure 2:
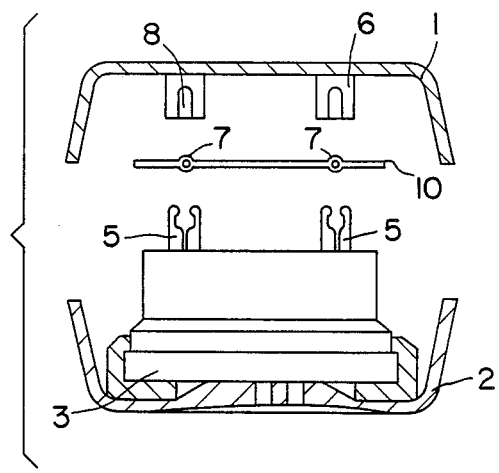
Figure 3:
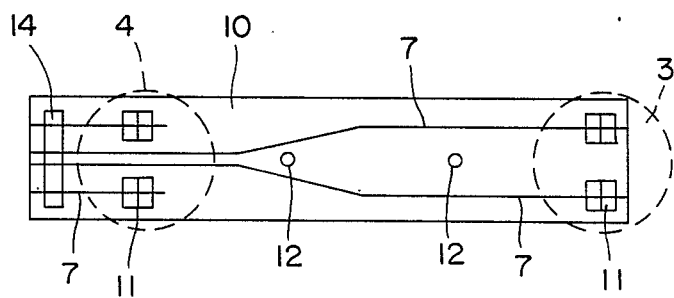
Figure 4:
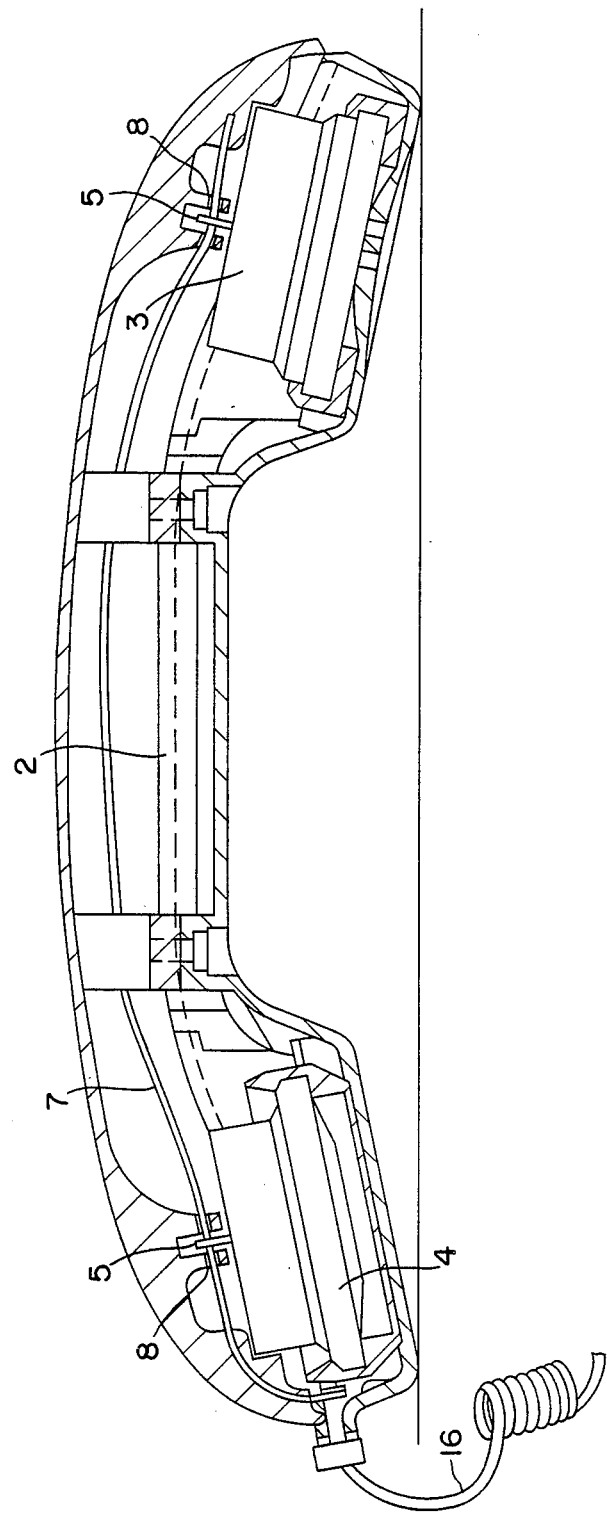

The hearing capsule 3 and the speaking capsule 4, as shown in FIGS. 1-4, are first inserted into the lower housing shell 2. On the side turned away from them, each one of the two electro-acoustic converters has two cutting clamp connections 5, which are arranged in such a manner that the leads running in the longitudinal direction of the handset can be inserted into the cutting clamp connections 5.

The upper housing shell 1 has projections 6, located in front of and behind the cutting clamp connections, each of them with a wire passage opening 8. The projections 6 and the wire passage openings 8 are arranged in such a manner that when the two housing shells are combined, the lead 7 is pressed into the contact-creating and fastening position in the cutting clamp connection 5. Thereby, the wire passage opening 8 guides the lead 7 into the opening of the cutting clamp connection 5.

The lead 7 can either be embedded in the upper housing shell 1 as plain wire or else be inserted into the upper housing shell 1 after the extrusion process, whereby it is held by the wire passage openings 8. It is also possible to insert the lead 7 in the form of an insulated wire into the opening of the cutting clamp connection 5 prior to attaching the housing shell 1.

An additional possibility is to use a foil 10, which contains the leads 7. The foil 10 has openings 11, which allow the projections 6 to pass through it. In order to guide the localization of the foil 10, it is also possible to provide guide pins 13, either on the upper housing shell 1 or on the lower housing shell 2, which pins engage in corresponding guide holes 12 in the foil.

A plug is provided for connecting a handset cord 1b, which cord can also be connected to the leads 7 by means of cutting clamp connections. Thereby, the contact plug can be pressed by the upper housing shell 1 against the projections 15 provided on the lower housing shell 2 in order to press the leads 7 into the cutting clamp connections of the contact plug in the same manner as already described for the connection of the electro-acoustic converter.

Further, it should be pointed out that the foil 10 can also be utilized to accommodate electronic components, which are connected to the leads 7.

We claim:

1. A telephone handset, comprising:
   a housing having a lower housing shell and an upper housing shell;

a hearing capsule and a speaking capsule disposed in the housing, each said capsule being an electro-acoustical converter and having a side turned toward an opening therefor in the lower one of said housing shells and a side turned inwardly toward the upper one of said housing shells;

electrical connections for the handset, including a handset cord and pairs of leads connecting each capsule to the handset cord by means of cutting clamp connections arranged on the side of each said hearing capsule and said speaking capsule which is turned away from the respective opening, and the upper housing shell having projections arranged vertically relative to the leads on both sides of the cutting clamp connections, whereby the projections push the leads into the cutting clamp connections.

2. The handset according to claim 1, wherein each of the projections is provided with a wire passage opening for the leads.

3. A telephone handset, comprising:

a housing having a lower housing shell and an upper housing shell;

a hearing capsule and a speaking capsule disposed in the housing, each said capsule being an electro-acoustical converter and having a side turned toward an opening therefor in the lower one of said housing shells and a side turned inwardly toward the upper one of said housing shells;

electrical connections for the handset, including a handset cord and pairs of leads connecting each said capsule to the handset cord by means of cutting clamp connections arranged on the side of each said hearing capsule and speaking capsule which is turned away from the respective opening, and the upper housing shell having projections arranged vertically relative to the leads on both sides of the cutting clamp connections, whereby the projections push the leads into the cutting clamp connections, the leads being mounted on and positioned by a foil.

4. The handset according to claim 3, wherein the foil has openings receiving the projections, whereby the leads are aligned to the cutting clamp connections.

5. The handset according to claim 3, wherein the foil has guide openings into which guide pins engage, the guide pins being arranged on one of the upper housing shell and the lower housing shell.

6. The handset according to claim 3, wherein at one end, the foil has an opening spanning all said lead pairs, for plug connection to the leads.

7. An improved telephone handset of the type including a housing having a lower housing shell and an upper housing shell; a hearing capsule and a speaking capsule disposed in the housing, each said capsule being an electro-acoustical converter and having a side turned toward an opening therefor in the lower one of said housing shells and a side turned inwardly toward the upper one of said housing shells; electrical connections for the handset, including a handset cord and pairs of leads connecting each capsule to the handset cord, the improvement comprising:

said electrical connections between the handset cord and the leads being made by means of cutting clamp connections arranged on the side of each said hearing capsule and speaking capsule which is turned away from the respective opening, and the upper housing shell having projections arranged vertically relative to the leads on both sides of the cutting clamp connections, whereby the projections push the leads into the cutting clamp connections upon assembling the upper housing shell and the lower housing shell.

8. The improved telephone handset according to claim 7, wherein the leads are mounted on and positioned by a foil.

* * * * *